United States Patent
Hunter et al.

(10) Patent No.: US 7,309,058 B2
(45) Date of Patent: Dec. 18, 2007

(54) FLEXIBLE BACKSEAT SEAL FOR GATE VALVE

(75) Inventors: Rick C. Hunter, Friendswood, TX (US); Daniel D. Comeaux, SugarLand, TX (US)

(73) Assignee: Vetco Gray Inc., Houston, TX (US)

( * ) Notice: Subject to any disclaimer, the term of this patent is extended or adjusted under 35 U.S.C. 154(b) by 53 days.

(21) Appl. No.: 11/291,447

(22) Filed: Dec. 1, 2005

(65) Prior Publication Data

US 2006/0118750 A1 Jun. 8, 2006

Related U.S. Application Data

(60) Provisional application No. 60/633,138, filed on Dec. 3, 2004.

(51) Int. Cl.
*F16K 41/14* (2006.01)

(52) U.S. Cl. ...................... 251/214; 251/330

(58) Field of Classification Search ............. 251/214, 251/330

See application file for complete search history.

(56) References Cited

U.S. PATENT DOCUMENTS

| | | | |
|---|---|---|---|
| 801,708 A | 10/1905 | Bowes, Jr. | |
| 3,013,769 A * | 12/1961 | Volpin | 251/330 |
| 3,037,521 A * | 6/1962 | Larry | 251/330 |
| 3,152,786 A * | 10/1964 | Soderberg et al. | 251/330 |
| 3,768,777 A * | 10/1973 | Hechler, IV | 251/330 |
| 4,307,745 A | 12/1981 | McGee | |
| 4,658,848 A | 4/1987 | Meyer et al. | |
| 4,682,757 A | 7/1987 | Shelton | |
| 5,127,629 A | 7/1992 | Holliday | |
| 5,238,252 A * | 8/1993 | Stewen et al. | 251/330 |
| 5,435,520 A * | 7/1995 | Vyvial | 251/330 |
| 5,730,419 A * | 3/1998 | Williams et al. | 251/214 |
| 5,908,046 A * | 6/1999 | Mosman | 251/214 |

* cited by examiner

*Primary Examiner*—John Bastianelli
(74) *Attorney, Agent, or Firm*—Bracewell & Giuliani LLP

(57) ABSTRACT

A gate valve has a body having a cavity and a stem passage extending from the cavity. A stem extends through the stem passage into the cavity for moving a gate in response to rotation of the stem. A conical backseat seal surface is formed at a junction of the stem passage with the cavity. A backseat seal has a leg extending outward from the stem and away from the stem passage. The leg has an outer surface with a sealing band that is spaced from the backseat seal surface during normal operation of the valve. The leg is flexible, causing the sealing band to deflect into sealing engagement with the backseat seal surface when the stem is moved axially to a backseat sealing position.

13 Claims, 3 Drawing Sheets

FLEXIBLE BACKSEAT SEAL FOR GATE VALVE

CROSS REFERENCE TO RELATED APPLICATION

This application claims priority to provisional application Ser. No. 60/633,138, filed Dec. 3, 2004.

FIELD OF THE INVENTION

This invention relates in general to gate valves, and in particular to a flexible backseat stem seal.

BACKGROUND OF THE INVENTION

A gate valve has a body with a cavity intersected by a flow passage. A gate moves in the cavity between a closed position, blocking flow through the flow passage and an open position. A stem engages the gate, and when rotated, causes the movement of the gate. The stem extends through a stem passage in the body of the gate valve. Stem seals seal between the stem and the stem passage, preventing leakage of pressure from the cavity. The gate may be either a single slab or two split gates. The gate valve may be a non-rising type, wherein the stem has threads that engage mating threads in the gate. In the non-rising type, the stem does not move axially when rotated. Alternately, the gate valve may be a rising type wherein the stem has threads that engage threads in the valve body.

Gate valves often have an emergency feature, called a backseat seal, that when actuated, will block pressure in the cavity from the stem seals. The backseat seal normally comprises an annular rigid conical profile on the stem that is normally spaced below a mating conical seal surface at the junction of the cavity with the stem passage. During normal opening and closing operation, the profile will not contact the seal surface. To actuate, the operator rotates a threaded retainer or collar at the upper end of the stem passage to allow the stem to move upward past its normal operating position so that the profile seals against the seal surface.

While the backseat seal as described is a workable design, sometimes it does not seal well, particularly if the valve has to qualify for a high pressure rating. Also, the conical profile can become damaged during factory acceptance testing. If so, it is costly to replace the stem.

SUMMARY OF THE INVENTION

The gate valve of this invention has a body having a cavity therein. A stem extends through a stem passage in the body into the cavity for moving a gate between open and closed positions. A conical backseat seal surface is located at a junction of the stem passage with the cavity. A backseat seal has conical inner and outer surfaces that define a conical leg extending away from the stem passage. The outer surface of the leg is spaced from the backseat seal surface during normal operation of the valve. The leg is flexible and deflects into sealing engagement with the backseat seal surface when the stem is moved axially to a backseat sealing position.

In one embodiment, the backseat seal has a bore through which the stem extends. A threaded retainer locks the backseat seal on the stem. The retainer has an upper portion that extends around a hub of the backseat seal. An upper seal seals between the hub and the retainer. A lower seal seals between the retainer and the stem. A test port enables test pressure to be applied between the seals to determine whether the bore of the hub leaks.

In a second embodiment, the backseat seal is integrally formed on the stem. A stop shoulder is located above the backseat seal for engaging a stop shoulder in the body. The leg of the backseat seal sealingly engages the seal surface in the body when the stop shoulders engage each other.

In a third embodiment, the backseat seal has a base that is stationarily mounted to the body. The leg depends downward and has a sealing band spaced from the backseat seal surface during normal operation. An annular band on the stem engages the leg and pushes it upward into sealing engagement while in the backseat seal position. The annular band also seals to the leg.

DETAILED DESCRIPTION OF THE DRAWINGS

Figure 1:
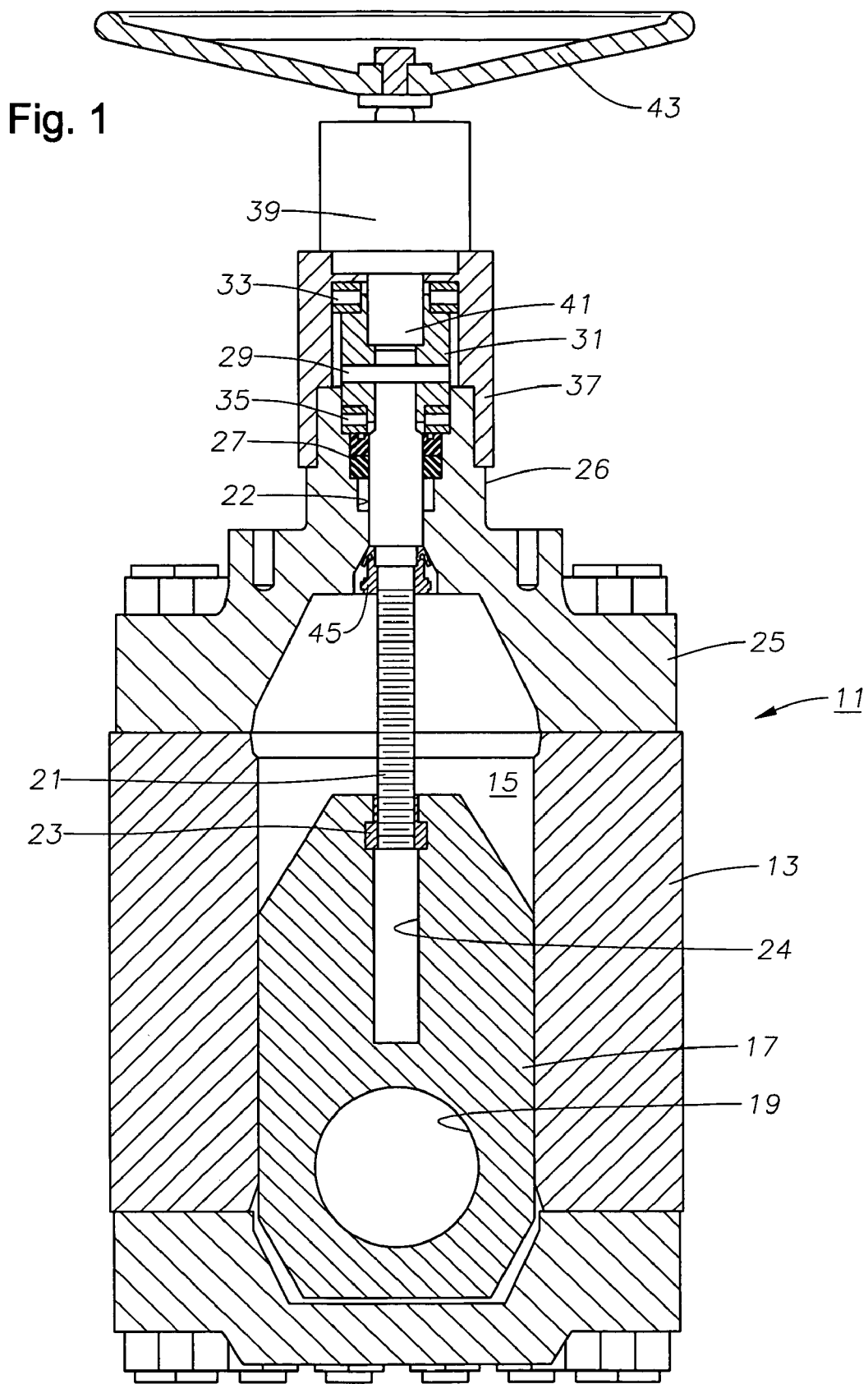
FIG. 1 is a vertical sectional view of a gate valve having a flexible backseat stem seal in accordance with this invention.

Referring to FIG. 1, gate valve 11 is of a type typically used in oilfield applications for controlling well fluid flow. Valve 11 has a body 13, which may be a single piece or multiple pieces as shown. Body 13 has a central gate cavity 15 having aligned inlet and outlet ports (not shown) for the flow of fluid through valve 11. Gate 17 strokes within gate cavity 15 and may be a single slab or a two-slab type. Gate 17 has an aperture 19 that aligns with the inlet and outlet ports (not shown) of valve 11 in the open position. Gate 17 blocks flow when in the closed position, which is the position shown in FIG. 1.

A stem 21 connects to gate 17 for moving gate 17 between the open and closed positions. Generally, in gate valves, there are two types of stems, one of which translates axially when rotated, referred to as a rising stem, and another that remains axially stationary when rotated, referred to as a non-rising stem. In this embodiment, stem 21 is a non-rising type. Stem 21 extends through a stem passage 22 into cavity 15, stem passage 22 being in fluid communication with cavity 15. Stem 21 engages a threaded nut 23 in gate 17 that translates rotational motion of stem 21 into axial movement of gate 17. When gate 17 moves upward to the open position, a lower portion of stem 21 will be located in a cavity 24 in gate 17.

Body 13 includes a bonnet 25, which is an upper housing that bolts to the upper end of body 13. Bonnet 25 forms the upper end of gate cavity 15 and has a neck 26 through which stem passage 22 extends. Stem seals 27 in stem passage 22 seal around stem 21 to prevent leakage of pressurized fluid from gate cavity 15. Stem seals 27 may be of a variety of types.

A variety of devices may be used to impart rotational motion to stem 21, including hydraulic, electrical and manual. In this example, a roll pin 29 connects the upper end of stem 21 to a bearing carrier 31. An optional bearing carrier 31 has upper and lower bearings 33, 35 for accommodating axial thrust imposed on stem 21 due to pressure in gate cavity 15. Smaller valves, particularly those having lower pressure ratings, may not require thrust bearings 33, 35. Bearing carrier 31 mounts rotatably within a stationary collar 37. Collar 37 secures by threads to the upper end of bonnet neck 26.

A gear box 39 mounts to collar 37 in this embodiment. Gear box 39 has an output shaft 41 that extends into a polygonal receptacle in bearing carrier 31. A hand wheel 43 connects to the input of gear box 39. Gear box 39 provides a mechanical advantage to the rotation of hand wheel 43. Gear box 39 is optional and many gate valves, particularly those of smaller size and lower pressure ratings, do not utilize a gear box.

A backseat seal assembly 45 locates at junction of stem passage 22 with the upper end of gate cavity 15. Backseat seal assembly 45 is normally in an unsealed condition, which allows any pressure in gate cavity 15 to communicate to stem seals 27. In the event of leakage of stem seals 27, the operator can actuate backseat seal assembly 45 to seal the pressure in gate cavity 15. Once the pressure in gate cavity 15 is relieved, the operator can replace stem seals 27.

Figure 2:
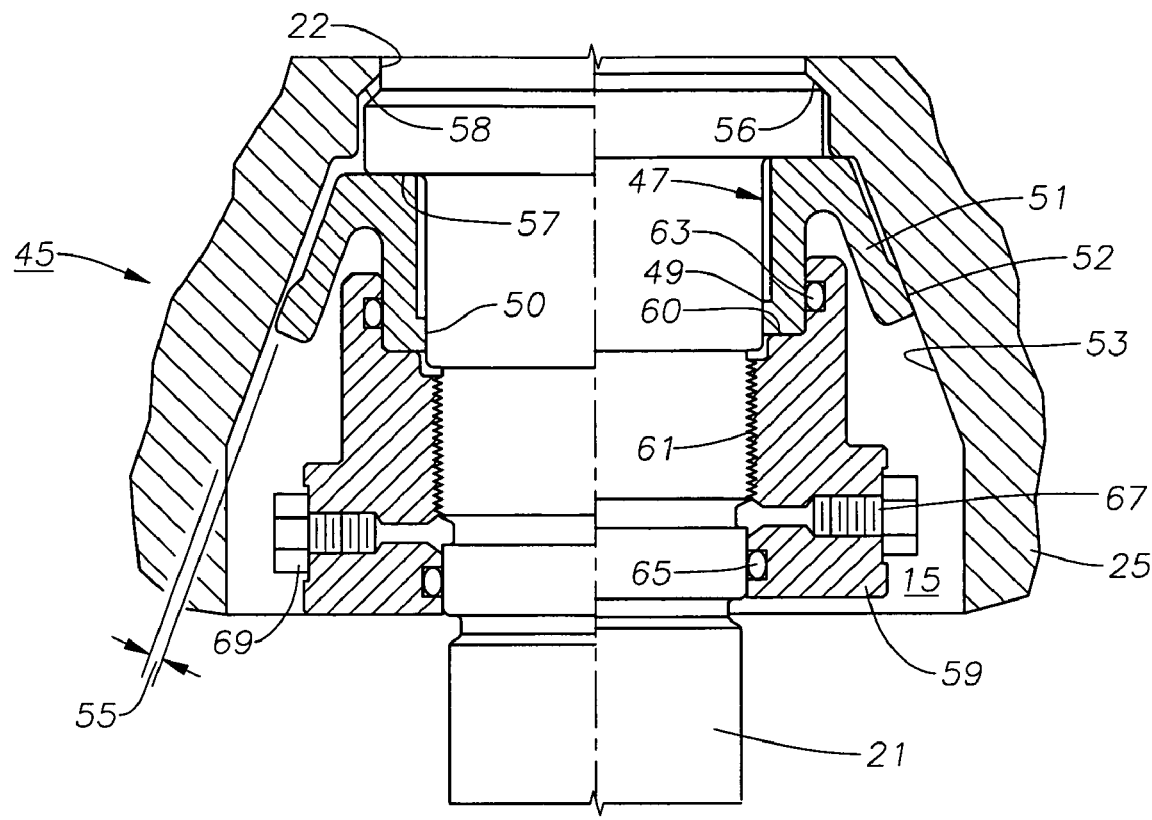
FIG. 2 is an enlarged sectional view of the backseat stem seal of FIG. 1, with the left side shown unsealed and the right side shown sealed.

Referring to FIG. 2, in the first embodiment, backseat seal assembly 45 comprises a metal seal member 47 having a generally V-shaped configuration when viewed in cross-section. Seal member 47 has a hub 49 with a bore having a sealing band 50 therein for sealingly engaging stem 21. Hub 49 is rigidly mounted to stem 21 for axial and rotational movement therewith. Hub 49 has an outer surface that is cylindrical in this example. Seal 47 has a conical leg 51 that joins the upper end of hub 49 and extends outward and downward at an acute angle relative to seal hub 49. Leg 51 has a length that is approximately the same as the axial length of hub 49. Leg 51 is resilient, flexible, and has a conical sealing band 52 on its outer surface at the lower end of leg 51. The inner surface of leg 51 is also conical at substantially the same angle as the outer surface of leg 51. The inner surface of leg 51 is spaced radially outward from the cylindrical outer surface of hub 49, defining an annular clearance between them. Leg 51 is thicker at sealing band 52 than in its upper portion.

While in the sealed position shown in the right side of FIG. 2, sealing band 52 engages a conical seal surface 53 located at the junction of stem passage 22 and gate cavity 15. In the unsealed condition, shown on the left side of FIG. 2, stem 21 is slightly lower relative to bonnet 25 than on the right side, defining a clearance 55 between sealing band 52 of leg 51 and seal surface 53.

The base or upper end of hub 49 of seal 47 abuts a stem shoulder 57 that is formed on stem 21 and faces downward. Stem 21 has an upward facing conical stop shoulder 58 that contacts a downward facing bonnet stop shoulder 56 formed stem passage 22 of bonnet 25 when stem 21 moves upward to the backseat sealing position, as shown on the right side of FIG. 2. On the left side of FIG. 2, stem stop shoulder 58 is spaced below bonnet stop shoulder 56 by a clearance. When stop shoulders 56, 58 contact each other, backseat seal leg 51 will be in sealing engagement with backseat seal surface 53.

Seal 47 may be attached to stem 21 in a variety of manners. In the embodiment shown, hub 49 of seal 47 is pressed over stem 21 in an interference fit such that the hub 49 deflects and sealing band 50 sealingly engages stem 21. In addition, a retainer 59 is preferably employed to retain seal 47 on stem 21. Retainer 59 secures by threads 61 to stem 21. Retainer 59 has a counterbore with an upward facing shoulder 60 that engages the lower end of hub 49 to retain seal 47 against stem shoulder 57. Retainer 59 may be used to produce the upward force required to install seal 47 onto stem 21.

Optionally, retainer 59 can also be used for testing the sealing engagement of stem leg 49 with stem 21 before bonnet 25 is assembled on body 13 (FIG. 1). This is accomplished by an elastomeric upper test seal 63 in the counterbore of retainer 59 that sealingly engages the cylindrical outer surface of hub 49 of seal 47. An elastomeric lower test seal 65 in retainer 59 below seal 47 sealingly engages stem 21. A test port 67 in retainer 59 allows an operator to introduce test pressure in the chamber between test seals 63, 65 to determine whether there is any leakage between sealing band 50 of hub 49 and stem 21. Plug 69, shown on the left side of FIG. 2, is preferably removed during normal use so that the operating pressure within gate cavity 15 communicates through test port 67 to the sealing engagement of sealing band 50 with stem 21. Elastomeric seals 63, 65 preferably serve only for test purposes and do have any function during normal operation.

In the operation of the embodiment of FIGS. 1 and 2, in normal use, collar 37 (FIG. 1) will be secured to neck 26 and locked by a set screw. The position of collar 37 will selected so that stem seal 47 is in the unsealed position shown on the left side of FIG. 2. Rotating stem 21 causes gate 17 to move either upward or downward between the open and closed positions. Backseat seal 47 rotates with stem 21, but its leg 51 will not touch seal surface 53 during normal operation because of clearance 55. Pressure within gate cavity 15 communicates through clearance 55 to stem seals 27 (FIG. 1).

If the operator detects leakage past stem seals 27, he can actuate backseat seal assembly 45. The operator does this by releasing the set screw and unscrewing collar 37 from bonnet neck 26 a selected distance. The pressure in gate cavity 15 causes stem 21 and backseat stem seal 47 (FIG. 2) to move upward an increment until stop shoulders 56, 58 contact each other. Leg 51 contacts seal surface 53 and deflects to form a metal-to-metal seal with sealing band 52. Hub 49 is always in sealing engagement with stem 21. Once sealing band 52 of leg 51 has engaged seal surface 53, the pressure in gate cavity 15 is blocked from communicating with stem seals 27 (FIG. 1) by backseat stem seal 47. The operator may then replace stem seals 27. Normally, the operator would first relieve the pressure in gate cavity 15 before removing stem seals 27 (FIG. 1) even though backseat stem seal 47 contains any pressure in gate cavity 15. After replacing, the operator retightens collar 37, which pushes stem 21 downward to the position shown on the left side of FIG. 2. This results in clearance 55 again occurring between seal leg 51 and seal surface 53.

Figure 3:
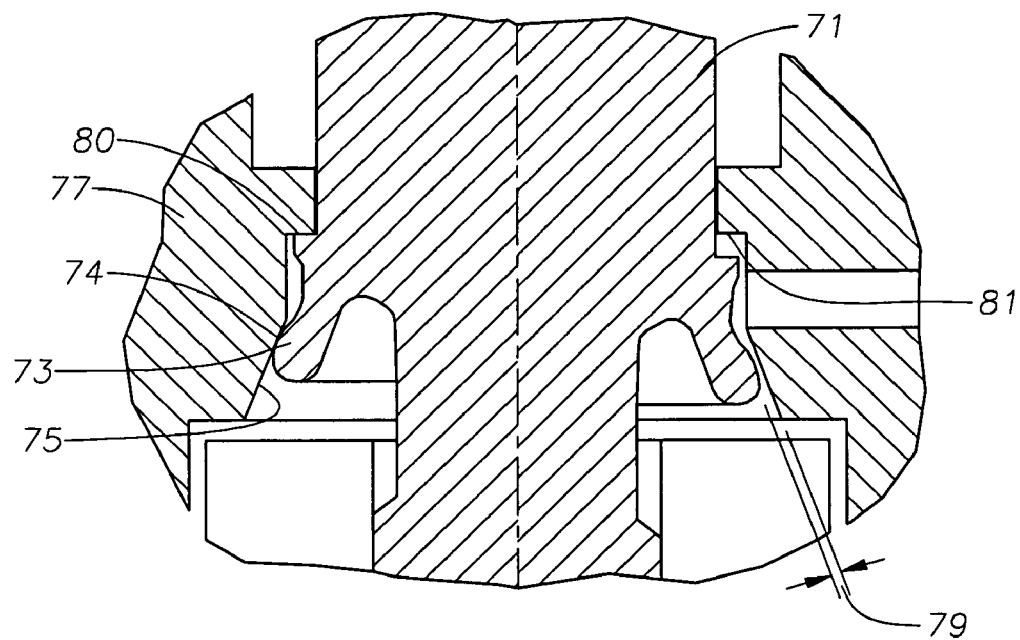
FIG. 3 is an enlarged view of an alternate embodiment of a flexible backseat stem seal, with the left side shown sealed and the right side shown unsealed.

In the embodiment of FIG. 3, metal stem 71 has a backseat seal 73 that is integrally machined on its surface. Backseat seal 73 comprises a depending conical leg that extends downward and outward. A sealing band 74 that is rounded in this embodiment is located on the outer conical surface of seal 73. A section of reduced thickness is located immediately upward from sealing band 74 to increase flexibility. Backseat seal 73 is resilient and sufficiently thin to deflect when engaging a seal surface 75 in bonnet 77 and form a metal-to-metal seal. On the left side of FIG. 3, which is the sealed position, an upward facing stem shoulder 80 on stem 71 is in abutment with a downward facing stop shoulder 81 formed in bonnet 77. On the right side, which is the operational position, stem 71 is located in a lower position, with stem shoulder 80 spaced below stop shoulder 81. The lower position of stem 71 defines a clearance 79 between seal 73 and bonnet seal surface 75. Stem 71 is moved between the operational position and the backseat sealing position in the same manner as described with the first embodiment.

Figure 4:
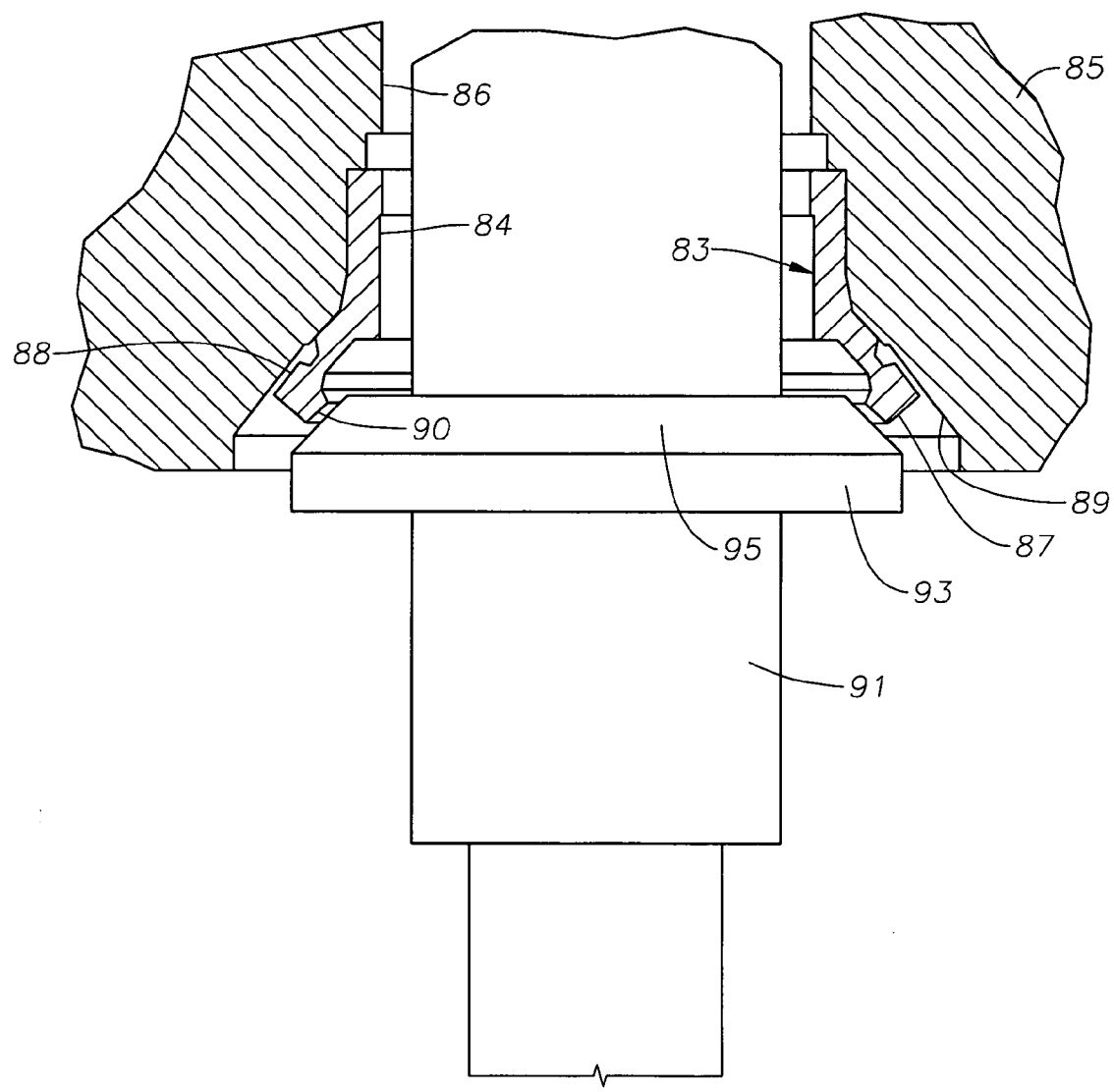
FIG. 4 is an enlarged sectional view of another embodiment of a flexible backseat stem seal shown in an unsealed condition.

Referring to FIG. 4, in this embodiment, a metal backseat seal 83 has a cylindrical hub 84 stationarily secured to bonnet 85 at the lower end of stem passage 86. Backseat seal 83 may be secured by threads or by an interference fit. A depending flexible, resilient, conical leg 87 extends downward and outward from a lower end of hub 84. Leg 87 has an outer conical sealing band 88 on its outer side and an inner conical sealing band 90 on its inner side. Sealing bands 88, 90 are located at the lower end of leg 87. During normal operation, outer sealing band 88 of leg 87 is spaced from a conical bonnet seal surface 89 by a clearance.

Stem 91 has an enlarged energizer band 93 machined integrally on it. Band 93 has an upward and outward facing conical seal surface 95 that is spaced from inner seal band 90 by a clearance during normal operation. Stem seal surface 95 is substantially parallel with bonnet seal surface 89.

To actuate backseat seal 83, the operator causes stem 91 to move upward in the same manner as described with the first embodiment. When stem 91 moves upward, stem seal surface 95 contacts seal leg 87 and pushes outer seal band 88 outward into sealing contact with bonnet seal surface 89. Metal-to-metal seals are formed between outer seal band 88 and seal surface 89 as well as between inner seal band 90 and stem seal surface 95.

The invention has significant advantages. The flexibility of the backseat seal enhances the ability to form a metal-to-metal seal. In two of the embodiments, if the backseat seal is damaged, it can be replaced without replacing or reworking the stem. The stop shoulders prevent over travel of the stem.

While the invention has been shown in only three of its forms, it should be apparent to those skilled in the art that it is not so limited but is susceptible to various changes without departing from the scope of the invention.

The invention claimed is:

1. A gate valve, comprising:
 a body having a cavity therein;
 a stem having an axis and extending through a stem passage in the body into the cavity for moving a gate between open and closed positions;
 a conical backseat seal surface at a junction of the stem passage with the cavity;
 a retaining shoulder on the stem facing away from the stem passage;
 a metal backseat seal;
 the backseat seal having a bore through which the stem passes and a base that contacts the retaining shoulder;
 a retainer secured to the stem and pressed against the backseat seal to maintain the backseat seal in contact with the retaining shoulder; and
 the backseat seal having conical inner and outer surfaces that define a conical leg extending away from the stem passage, the outer surface of the leg being spaced from the backseat seal surface during normal operation of the valve, the leg being flexible and deflecting into sealing engagement with the backseat seal surface when the stem is moved axially to a backseat sealing position.

2. The gate valve according to claim 1, further comprising:
 an annular band formed on the outer surface of the leg for sealingly engaging the backseat seal surface.

3. The gate valve according to claim 1, wherein the conical inner and outer surfaces of the leg extend substantially at the same taper angle.

4. The gate valve according to claim 1, further comprising:
 a stop shoulder in the body between the stem passage and the backseat seal surface; and
 a stem shoulder on the stem that engages the stop shoulder when the stem is in the backseat sealing position.

5. The gate valve according to claim 1, wherein the bore of the backseat seal has a cylindrical inner wall surface that seals to the stem, and the backseat seal has a hub with an outer wall surface spaced radially inward from the leg.

6. A gate valve, comprising:
 a body having a cavity therein;
 a stem having an axis and extending through a stem passage in the body into the cavity for moving a gate between open and closed positions;
 conical backseat seal surface at a junction of the stem passage with the cavity;
 a backseat seal having conical inner and outer surfaces that define a conical leg extending away from the stem passage, the outer surface of the leg being spaced from the backseat seal surface during normal operation of the valve, the leg being flexible and deflecting into sealing engagement with the backseat seal surface when the stem is moved axially to a backseat sealing position;
 a retaining shoulder on the stem facing away from the stem passage;
 the backseat seal having a bore through which the stem passes and a base that contacts the retaining shoulder; and
 a threaded retainer mounted to the stem by threads and pressed against the backseat seal to maintain the backseat seal in contact with the retaining shoulder.

7. The gate valve according to claim 1, wherein the backseat seal has a hub that contains the bore through which the stem passes, the hub having an outer cylindrical wall spaced radially inward from the leg; and wherein the gate valve further comprises:
 a retainer secured to the stem in engagement with the backseat seal to secure the backseat seal to the stem for movement therewith;
 a first seal between the retainer and the outer cylindrical wall of the hub;
 a second seal between the retainer and the stem; and
 a test port in the retainer for introducing test pressure between the first and second seals to determine whether leakage between the bore of the hub and the stem exists.

8. A gate valve, comprising:
 a body having a cavity therein and a stem passage extending from the cavity;
 a stem having an axis and extending through the stem passage into the cavity for moving a gate between open and closed positions in response to rotation of the stem;
 a conical backseat seal surface at a junction of the stem passage with the cavity; and
 a metal backseat seal mounted to the stem for axial movement therewith, the backseat seal having a hub with a bore through which the shaft extends, the backseat seal having a leg extending outward from the hub and away from the stem passage, the leg having an inner surface spaced from the hub by an annular clearance, the leg having an outer surface with a sealing band thereon that is spaced from the backseat seal surface during normal operation of the valve, the leg being flexible, causing the sealing band to deflect into sealing engagement with the backseat seal surface when the stem is moved axially to a backseat sealing position.

9. The gate valve according to claim 8, wherein:
the hub has an outer wall spaced radially inward from the inner surface of the leg and separated from the inner surface of the leg by the annular clearance.

10. The gate valve according to claim 8, further comprising:
a retaining shoulder on the stem facing away from the stem passage;
the hub of the backseat seal having one end that contacts the retaining shoulder; and
a threaded retainer mounted to the stem by threads and pressed against another end of the hub of the backseat seal to maintain said first mentioned end of the hub in contact with the retaining shoulder.

11. The gate valve according to claim 8, wherein the hub has an outer cylindrical wall spaced radially inward from the leg; and wherein the gate valve further comprises:
a retainer secured to the stem by threads in engagement with the hub of the backseat seal to secure the backseat seal to the stem for movement therewith;
a first seal between the retainer and the outer cylindrical wall of the hub;
a second seal between the retainer and the stem; and
a test port in the retainer for introducing test pressure between the first and second seals to determine whether leakage between the bore of the hub and the stem exists.

12. The gate valve according to claim 8, wherein the leg has a reduced thickness section extending from the sealing band toward the stem passage, the leg having a lesser thickness in the reduced thickness section than at the sealing band.

13. The gate valve according to claim 8, further comprising:
a retaining shoulder on the stem facing away from the stem passage;
the hub having a first end that contacts the retaining shoulder; and
a retainer secured to the stem and pressed against a second end of the hub to maintain the second end of the hub in contact with the retaining shoulder.

* * * * *